(12) United States Patent
Steen et al.

(10) Patent No.: US 7,440,832 B2
(45) Date of Patent: Oct. 21, 2008

(54) METHOD AND ARRANGEMENT FOR CONTROLLING ACTUAL TORQUE IN A LAND VEHICLE DRIVELINE

(75) Inventors: Marcus Steen, Angered (SE); Anders Eriksson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 516 days.

(21) Appl. No.: 11/307,552

(22) Filed: Feb. 13, 2006

(65) Prior Publication Data

US 2006/0116806 A1 Jun. 1, 2006

Related U.S. Application Data

(63) Continuation of application No. PCT/SE2004/001196, filed on Aug. 16, 2004.

(30) Foreign Application Priority Data

Aug. 27, 2003 (SE) .................................. 0302316

(51) Int. Cl.
G06F 17/00 (2006.01)

(52) U.S. Cl. .............................. 701/51; 701/22; 701/54; 701/41; 701/104; 701/101; 477/54; 477/107; 477/110; 477/111

(58) Field of Classification Search ................... 701/51, 701/54, 22, 41, 101, 104; 477/107, 110, 477/111, 54

See application file for complete search history.

(56) References Cited

U.S. PATENT DOCUMENTS

| 5,738,606 | A | * | 4/1998 | Bellinger | 477/111 |
| 5,746,679 | A | * | 5/1998 | Minowa et al. | 477/92 |
| 5,848,371 | A | * | 12/1998 | Creger | 701/101 |
| 5,876,302 | A | * | 3/1999 | Palmeri | 477/111 |
| 6,094,617 | A | * | 7/2000 | Lapke | 701/104 |
| 6,186,925 | B1 | * | 2/2001 | Bellinger | 477/175 |

(Continued)

FOREIGN PATENT DOCUMENTS

EP 0833042 4/1998

OTHER PUBLICATIONS

International Search Report from corresponding International Application No. PCT/SE2004/001196.

*Primary Examiner*—Thomas G Black
*Assistant Examiner*—Wae Louie
(74) *Attorney, Agent, or Firm*—WRB-IP LLP

(57) ABSTRACT

Method and arrangement for controlling actual torque in a driveline of a land-based motor vehicle. Taking a direct, non-predictive measure of actual torque induced in the driveline of the motor vehicle and ascertaining a magnitude thereof. Ascertaining a magnitude of a torque demand being requested to be instituted in the driveline. Comparing the ascertained magnitude of the direct, non-predictive measure of actual torque taken is compared with a driveline-configuration dependent maximum torque threshold; in this way, an over-threshold torque condition is ascertained in the driveline based thereupon if such a condition exists. In multi-geared transmissions, the variability can be accounted for through the engagement of different ratio gears. In the event that such an over-threshold torque condition is detected, at least one of several possible over-threshold torque compensating effects will be applied to reduce or diminish the excessive portion of the torque. The remedial measure may be chosen from several possibilities including reconfiguring the variable ratio transmission and/or reducing powerplant-induced driveline torque.

33 Claims, 5 Drawing Sheets

U.S. PATENT DOCUMENTS

| | | | |
|---|---|---|---|
| 6,440,038 B1 * | 8/2002 | Holloway | 477/54 |
| 6,560,549 B2 * | 5/2003 | Fonkalsrud et al. | 702/41 |
| 6,663,535 B2 * | 12/2003 | Holloway | 477/110 |
| 6,845,305 B1 * | 1/2005 | Raftari et al. | 701/22 |
| 7,096,111 B2 * | 8/2006 | Birkner et al. | 701/104 |
| 7,146,263 B2 * | 12/2006 | Guven et al. | 701/54 |
| 7,356,401 B2 * | 4/2008 | Romer et al. | 701/84 |
| 2002/0132699 A1 * | 9/2002 | Bellinger | 477/107 |
| 2006/0116806 A1 * | 6/2006 | Steen et al. | 701/51 |

* cited by examiner

METHOD AND ARRANGEMENT FOR CONTROLLING ACTUAL TORQUE IN A LAND VEHICLE DRIVELINE

The present invention is a continuation of International Application No. PCT/SE2004/001196, filed Aug. 16, 2004, which claims priority to SE 0302316-5, filed Aug. 27, 2003, both of which are hereby incorporated by reference.

The invention relates to a method and arrangement for controlling torque in a vehicle's drivetrain; and more particularly, the invention relates to a control system and process for regulating the amount of torque permitted to be imposed on a vehicular driveline from the powerplant based on prescribed threshold torque levels and an actual torque measurement taken directly from the driveline.

All vehicular transmissions are designed to safely operate up to a maximum input torque level. More specifically, it is possible to define, for each single ratio of a given transmission, a maximum torque level. Obviously, different transmission ratios of a transmission may have very different actual torque capacities. For instance, the direct drive ratio (i.e. 1:1) is commonly achieved without torque transfer via meshing gear cogs; the torque is transferred directly through the transmission and not via a countershaft. For that reason, the actual torque capacity of a direct drive ratio will exceed the torque capacities of the other transmission ratios by a significant amount. The maximum torque input value at which all of the selectable transmission ratios can safely operate is referred to as "nominal input torque capacity."

In order to avoid operating conditions in which the torque capacity of the transmission is exceeded, the transmission has to be over-designed with respect to the engine, so that the maximum torque input value at which all of the selectable transmission ratios can safely operate is higher than the maximum engine torque. This means that the mass of the transmission components will be higher than required in most circumstances resulting in a higher cost of the transmission than would otherwise be required. Alternatively, it is also possible to limit the output torque of the engine so that it never exceeds the maximum torque input value at which all of the selectable transmission ratios can safely operate. This can be achieved either by selecting the engine with a proper effective power, or by controlling the engine so as never to exceed the torque capacity of the transmission.

Typically, modern motor vehicles, and especially heavier commercial vehicles, are equipped with an engine controller that governs the engine output torque based on various parameters including, for example, the position of the accelerator pedal, the engine speed, the engine load, or the cruise control status. It has already been suggested to regulate the output torque of an internal combustion engine under powering conditions according to, among other parameters, driveline torque capacity considerations. In order to avoid operating conditions in which the torque capacity of the transmission is exceeded, the engine controller limits the output torque of the engine to a maximum torque value, which has to be less than, or equal to the nominal input torque capacity. It has also been suggested, as in EP 0 833 042, to take into account the fact that the absolute torque capacity of individual transmission ratios of a transmission may vary, and then control the engine torque based on the current transmission ratio so that the engine torque never exceeds the specific torque capacity of the currently engaged transmission ratio.

An increasing number of vehicle operators choose to have their engines tuned so as to deliver more power than for which the engines were originally designed. Conventionally, driveline torque has been predicted or estimated based on measured or otherwise assessed engine physical and performance conditions. Because of tuning, the predictive information delivered by the engine controller with respect to such things as throttle opening and engine power can no longer be considered as reliable as before modification. Therefore, it becomes practically impossible to properly limit the engine output torque with a conventional engine control arrangement, and the driveline components may suffer, resulting in poor driveline durability.

Another problem arises when the engine is used for braking the driveline. Several methods of using the engine as a load for braking the driveline are known. In the engine braking mode, however, the delivered braking torque applied by the engine cannot be precisely controlled. Therefore, the engine braking torque can often exceed the torque capacity of the engaged transmission ratio of the transmission. The engine braking torque during coast mode operation should be a function of the boost pressure or of the setting of the engine compression brakes. The applied braking torque can therefore theoretically be assessed using a boost pressure signal and a current setting of the engine compression brakes as suggested in U.S. Pat. No. 5,921,883. This requires that such a function be set in advance in the engine controller. Again, if the engine is tuned after manufacture, however, the set function becomes unreliable.

Alternatively, it is also possible to estimate the engine retarding force based on Newton's second law $F = m_e A$, wherein F is the engine retarding force, $m_e$ is the effective mass of the vehicle and A is the engine or vehicle acceleration. However, this method is not applicable when the mass of the vehicle cannot be determined with sufficient accuracy as in the case of a freight transporting truck which can widely vary depending on the load being carried.

The foregoing shortcomings of known systems and methods can be addressed according to aspects of the present invention. More specifically, aspects of the invention aim at controlling the powerplant of a motor vehicle so as to avoid driveline damage, or at least control over-torque conditions in the driveline to operator-acceptable levels.

In at least one aspect, the present invention takes the form of a method for controlling actual torque in a driveline of a land-based motor vehicle. In a conventional manner, the motor vehicle includes a drivetrain having a powerplant interconnected with at least one ground engaging drive wheel via a driveline. The driveline includes at least a variable ratio transmission, but also preferably further includes input shafts and output shafts that operate in association with the transmission. It should be appreciated that in this context, powerplant is utilized to include not only an engine, typically of the combustion-type, but also associated subsystems that cooperate with the main engine to generate a torque that is applied to the driveline. The method includes taking a direct, non-predictive measure of actual torque induced in the driveline of the motor vehicle and ascertaining a magnitude thereof. Such a direct taking of a nonpredictive measure of actual torque in the driveline is exemplary disclosed in U.S. Pat. No. 6,487,925. This measurement of actual torque can be contrasted to the predictive procedures described hereinabove with respect to previously known and inferior control systems that are susceptible to inaccuracies, especially after modifications have been made to the powerplant after original manufacturer, particularly those referred to as "tuning" the engine to have a greater power output. The method also contemplates ascertaining a magnitude of a torque demand being requested to be instituted in the driveline. Typically, this torque demand is either made by the operator directly, or on his or her behalf, for example, via a cruise control system. In the instance of a direct command, most conventionally, this is provided through operator manipulatable foot pedals. Those skilled in the art, however, will readily recognize that there is a multitude of modalities through which such commands can be communicated. The ascertained magnitude of the direct, non-predictive measure of actual torque taken is compared with a driveline-configuration dependent maximum torque threshold; in this way, an over-threshold torque condition is ascertained in the driveline based thereupon if such a condition exists. An easily recognized example of such driveline configuration variability is found in the different configurations made possible by variable ratio transmissions. In an exemplary manner, in the instance of multi-geared transmissions, the variability can be accounted for through the engagement of different ratio gears. In the event that such an over-threshold torque condition is detected, this aspect of the invention specifies that at least one of several possible over-threshold torque compensating effects will be applied to reduce or diminish the excessive portion of the torque. It is contemplated that the remedial measure may be chosen from several possibilities including reconfiguring the variable ratio transmission and/or reducing powerplant-induced driveline torque. In the first instance, reconfiguration of the transmission could include changing gears of a multi-gear transmission, or changing the configuration of a continuously variable transmission. If reducing powerplant-induced torque, the power output may be reduced in the instance of positive torque application, or resistive or drag torque may be relieved in the instance of negative torque imposition, commonly referred to as engine brake mode. It should be appreciated that the remedial measures prescribed herein are instituted only when over-threshold torque conditions are detected. The inquiry for such conditions is continuously made, but the corrective measures are only employed when the detrimental condition of over-threshold torque exists.

In a further aspect of the invention, the method includes determining, prior to choosing reconfiguration of the variable ratio transmission, that, based on existing vehicle operating conditions and the magnitude of the torque demand being requested to be instituted in the driveline, a plurality of acceptable configurations of the variable ratio transmission exist that diminish the ascertained over-threshold torque condition in the driveline. It will be appreciated by those skilled in the art that given a set of existing vehicle travel conditions and corresponding powertrain operating conditions, changes to all possible transmission configuration will not always be feasible for either system or comfort reasons. In any event, the impact of reconfiguration to any and all of the possible driveline configurations can be assessed for the prevailing vehicle travel conditions. This having been done, and an array of possible reconfiguration choices established, this aspect of the invention contemplates selecting among the plurality of acceptable configurations of the variable ratio transmission one that provides a best-fit with prescribed operational criteria. In this context, best-fit is utilized to indicate an optimized satisfaction of controlling criteria such as maximized comfort and minimized over-threshold torque inducement in the driveline.

In an associated aspect the invention contemplates a determination, prior to choosing reconfiguration of the variable ratio transmission, that, based on existing vehicle operating conditions and the magnitude of the torque demand being requested to be instituted in the driveline, there exists at least one acceptable configuration of the variable ratio transmission that diminishes the ascertained over-threshold torque condition in the driveline. It could be possible that the most advantageous configuration already prevails and that no advantage can be gained by reconfiguration of the driveline. As presently utilized, it should be appreciated that the terminology "diminish" does not necessarily require the elimination of excess torque inducement, but simply refers to a reduction in the excessive portion. After the requisite determinations have been made, reconfiguration is then effected to the variable ratio transmission to the at least one acceptable configuration of the variable ratio transmission determined to diminish the ascertained over-threshold torque condition in the driveline.

As intimated above, a torque sensing device or sensor positioned at the driveline to measure the actual torque induced in the driveline of the motor vehicle is advantageously utilized such as that disclosed in U.S. Pat. No. 6,487,925.

When the driveline protective teachings of the present invention are implemented, tuning the powerplant, on an after-market basis, is enabled thereby permitting the achievement of greater powerplant output capacity without risk of detrimental affect the driveline of the motor vehicle.

In an alternative embodiment, implementation of these control measures facilitates the pairing of an over-capacity powerplant with a relative under capacity driveline. Because the permissible torque threshold can be adjusted, knowledgeable users who are willing to accept an overburden on their driveline in order to gain greater power can do so.

In a related aspect, because an actual torque measurement is taken from the driveline, spiraling power collapses that would have been experienced with previously known driveline protection systems are avoided. As described hereinabove, protective systems are known, that, for example, prevent the inducement of an over-nominal capacity driveline torque. But if the engine were to be tuned to develop greater power, or the engine was modified so that predictive operating features of the engine indicated greater torque output than was actually being delivered, earlier protective systems that were based on these engine-based, predictive characteristics, instead of an actual measure of driveline torque would continue to reduce applied power in a downwardly spiraling control loop.

Because the control arrangement of the present invention is a programmable computer controller, the controlling algorithms can be adapted to produce user-desired powertrain characteristics. Therefore, further conditions and operating features may be considered in the implementation of the control strategy. As one example, an aspect of the invention optionally contemplates reducing the maximum permissible torque threshold based on an ascertainment that the driveline is not fully broken in and therefore more susceptible to be detrimental effects of imposed torque. In a related aspect, the maximum torque threshold can be adjusted based on the temperature of the driveline. If below a prescribed operating temperature threshold, maximum permissible torque inducement will be commensurately reduced. This appreciates the fact that a driveline that has not yet achieved operating temperature does not withstand torques of similar magnitudes as well as fully warmed drivetrain. A similar aspect takes into account that a driveline in which the differential interconnection is locked will withstand greater torque impositions, without detrimental effects, than unlocked configurations; therefore, the maximum torque threshold can be commensurately increased. In an associated aspect, the control strategy can be configured to include a bias toward such locked configurations of a differential thereby permitting greater torque inducements into the driveline.

Heretofore, the aspects of the present invention described hereinabove have been primarily focused on drivetrains operating in power mode, but aspects of the invention also contemplate utilization in engine braking modes. Because of the enabled control strategies, greater engine braking capacity can be permitted, acknowledging the fact that the service life period of the driveline will be commensurately compromised. In an opposite way, the maximum torque threshold can be reduced thereby reducing engine braking capacity, but increasing the service life period of the driveline.

As discussed hereinabove, it is appreciated that a plurality of acceptable threshold torque capacities of the driveline may be ascertaining, each dependent upon discreet and different configurations of the variable ratio transmission. Among the several configuration possibilities, however, there will typically be one ratio configuration that produces a least-excessive torque magnitude as measured based on a comparison between the determined torque demand and the plurality of threshold torque capacities. Once the most advantageous configuration is identified, it is subsequently assumed thereby producing a minimized over-threshold torque sufficient to satisfy the torque demand magnitude and mechanically preserving the driveline.

BRIEF DESCRIPTION OF THE DRAWINGS

Other advantages and features of the invention will become more clearly apparent from the following description of specific embodiments of the invention given as non-restrictive examples only and represented in the accompanying drawings in which.

DETAILED DESCRIPTION

Figure 1:
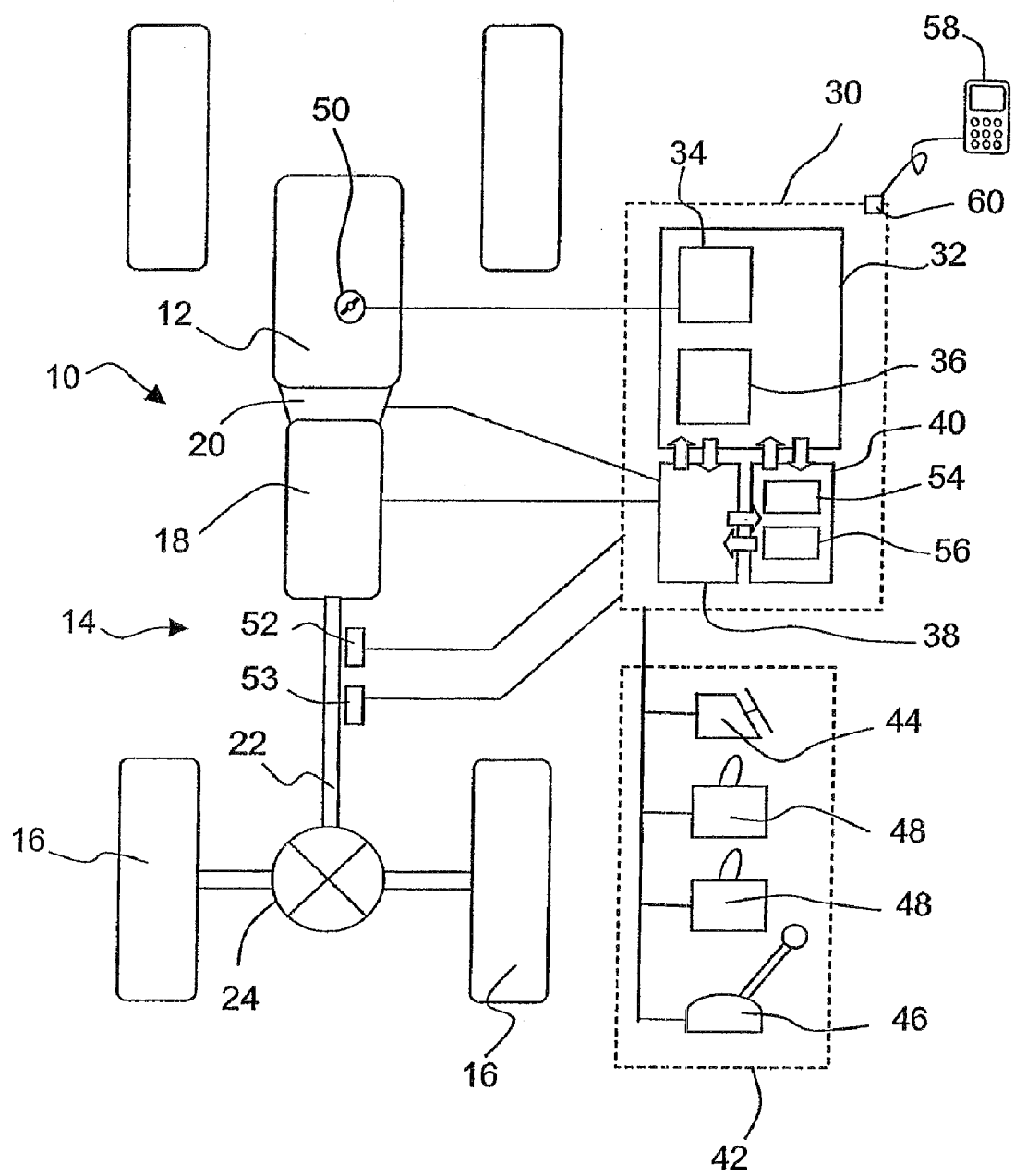
FIG. 1 is a diagrammatic illustration of a drivetrain with a drivetrain control device in accordance with one aspect of the invention.

Referring to FIG. 1, a drivetrain 10 is shown including a powerplant, typically in the form of an internal combustion engine 12, and a driveline 14 for transmitting engine power to a set of drive wheels 16. The driveline 14 comprises (includes, but is not limited to) an at least semi-automatic transmission 18, a main clutch 20 positioned between the engine 12 and the automatic transmission 18 and a propeller shaft 22 for transmitting power to a transversal differential 24 which distributes the power to the set of left and right drive wheels 16. Power utilizers in the form of power take-offs can also be included, but which are not shown in the illustrations.

A drivetrain control system 30 is used for controlling and managing the operation of the internal combustion engine 12 and of the driveline components. The drivetrain control system 30 comprises an engine control unit 32 provided with a fuelling control subunit 34 and an engine braking control subunit 36, a transmission control unit 38 and a torque limitation control unit 40 which are interconnected so as to share information as needed. The engine control unit 32 is connected to a driver interface 42 with sensors for detecting the position of an accelerator pedal 44, of a transmission selector lever 46 and one or more engine brake selection switches 48.

The engine control unit 32 is responsive to the accelerator pedal sensor to determine a corresponding basic torque request. The drivetrain control system may further comprise a cruise control sub-unit for delivering a cruise control torque request.

The fuelling control subunit 34 controls a throttle opening percentage of the engine throttle 50 and for supplying the engine 12 with fuel in response to a torque request delivered by the engine control unit.

The engine braking control subunit 36 controls exhaust valve actuators for the exhaust valves of each of the cylinders of the engine to provide engine braking as is known in the art, based on a engine braking command signal. To decrease the engine braking torque, the engine braking control unit 36 is operative to control the number of cylinders subject to engine brake operation. If this is not sufficient, the engine braking control unit is operable to deactivate one or more of the engine accessories; e.g., the air conditioning or the engine-cooling fan.

The drivetrain control system 30 is also connected to a torque sensor 52 positioned downstream from the main clutch 20, either between the main clutch 20 and the transmission 18 or at another location of the driveline, for instance, on the propeller shaft 22.

The transmission control unit 38 is operable to change the transmission ratio of the transmission and to deliver information about the presently engaged transmission ratio. Alternatively, the drivetrain control system may be operable to determine the presently engaged transmission ratio based on a ratio of the revolution speed of the transmission output shaft measure by a revolution speed sensor 53 to the revolution speed of the transmission input shaft measured by a revolution speed sensor (not shown).

The torque limitation control unit 40 comprises a first memory 54, which contains data in a first matrix representing, for each single forward and rearward transmission ratio, a positive torque capacity that should not be exceeded, and a second memory 56 that contains data in a second matrix representing, for each single forward and rearward transmission ratio, a negative torque capacity that should not be exceeded. For the purpose of the description, it will be assumed that torque values are signed values, which are positive when the torque is transmitted from the engine to the vehicle wheels (drive torque), and negative when the engine acts as a load and brakes the driveline (brake torque).

A service or calibration tool 58 can be connected to the drivetrain control system via an input/output port 60, and may be used to program or reprogram the drivetrain control system 30 with calibration data and/or executable software.

Figure 2:
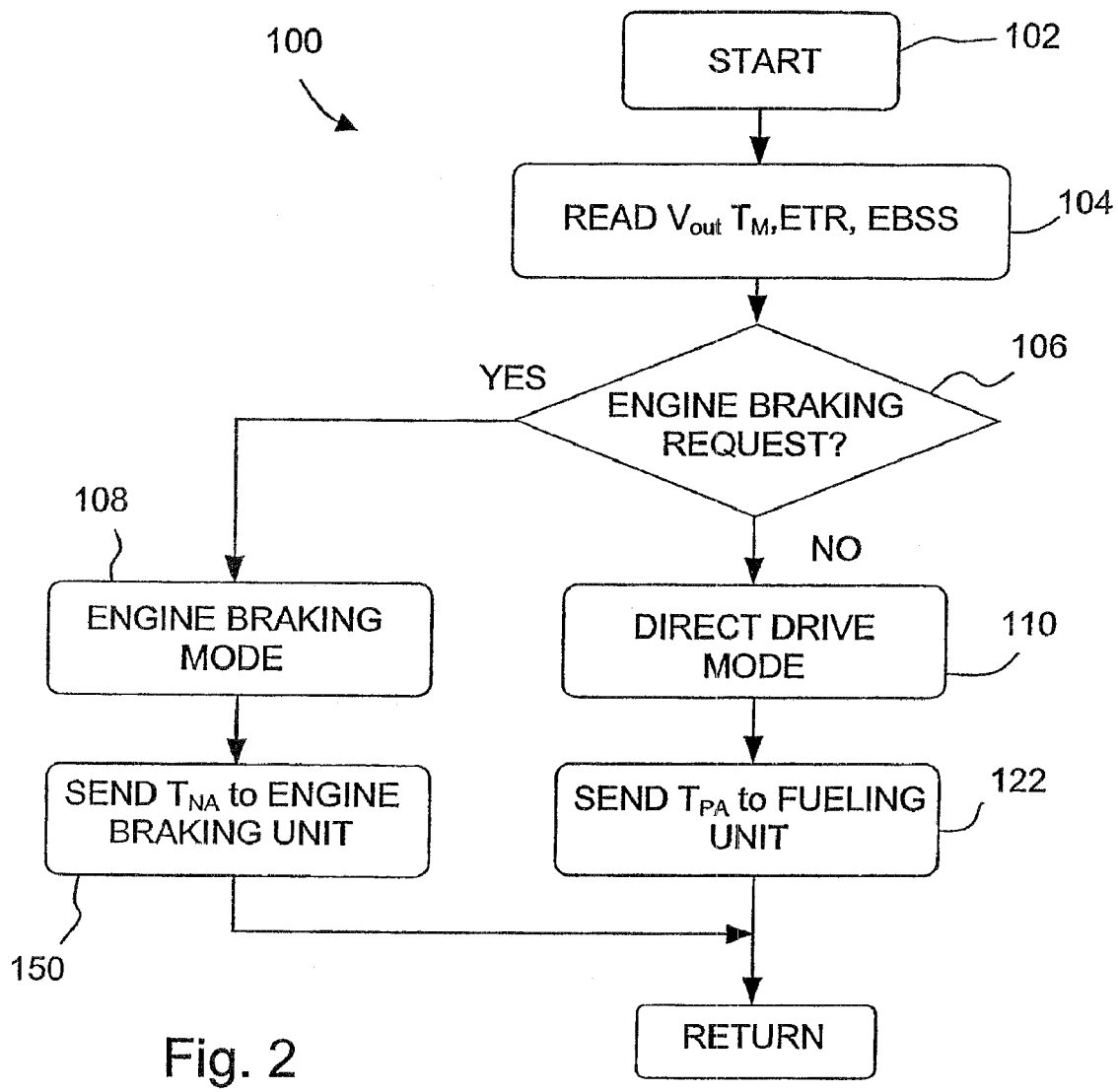
FIG. 2 is a flow chart of an exemplary embodiment of a software algorithm for the drivetrain control system for controlling the engine torque as diagrammatically illustrated in FIG. 1.

Referring now to FIG. 2, one embodiment of a software algorithm 100 of the drivetrain control system for controlling the engine torque is shown. This algorithm 100 should preferably be repeated one or several times per second. For the purpose of describing the operation of the algorithm, it will be assumed that the algorithm is executed by the torque limitation control unit, although the present invention contemplates that the algorithm may be executed by any unit of the drivetrain control system, or that different steps of the algorithm can be executed in different units of the drivetrain control system, provided the appropriate information is shared between the units of the drivetrain control system.

The algorithm 100 starts at step 102. At step 104, various signals from sensors are measured and exemplarily include: a measured current driveline torque value $T_M$ from the torque sensor 52; a demand torque, exemplarily measured from operator control pedal positions via one or more pedal position sensors; an engaged transmission ratio signal ETR; a transmission input shaft revolution speed signal; a transmission output shaft or propeller shaft revolution speed, $V_{out}$; a transmission oil temperature signal value, $\ominus_O$; and a signal from the engine braking selection switch EBSS. The transmission output shaft speed $V_{out}$ can also be determined based on a rotation speed signal of a drive wheel speed sensor. For the sake of simplification, it will be assumed that the measured current driveline torque value $T_M$ represents the torque on the transmission input shaft. If the torque sensor is located downstream from the transmission, the torque sensor signal should be multiplied by the effective transmission ratio ETR to obtain the measured driveline torque value $T_M$. At step 106, it is decided whether the engine should be operated in an engine braking mode. This decision is taken preferably based on the position of an operator controlled selection switch and the position of the operator pedals. If the accelerator pedal is released and one of the selection switches has been switched on, it is exemplarily decided to branch to the engine braking mode subroutine 108 which will be discussed further hereinbelow. Otherwise, the algorithm branches to the drive mode subroutine 110.

Figure 3:
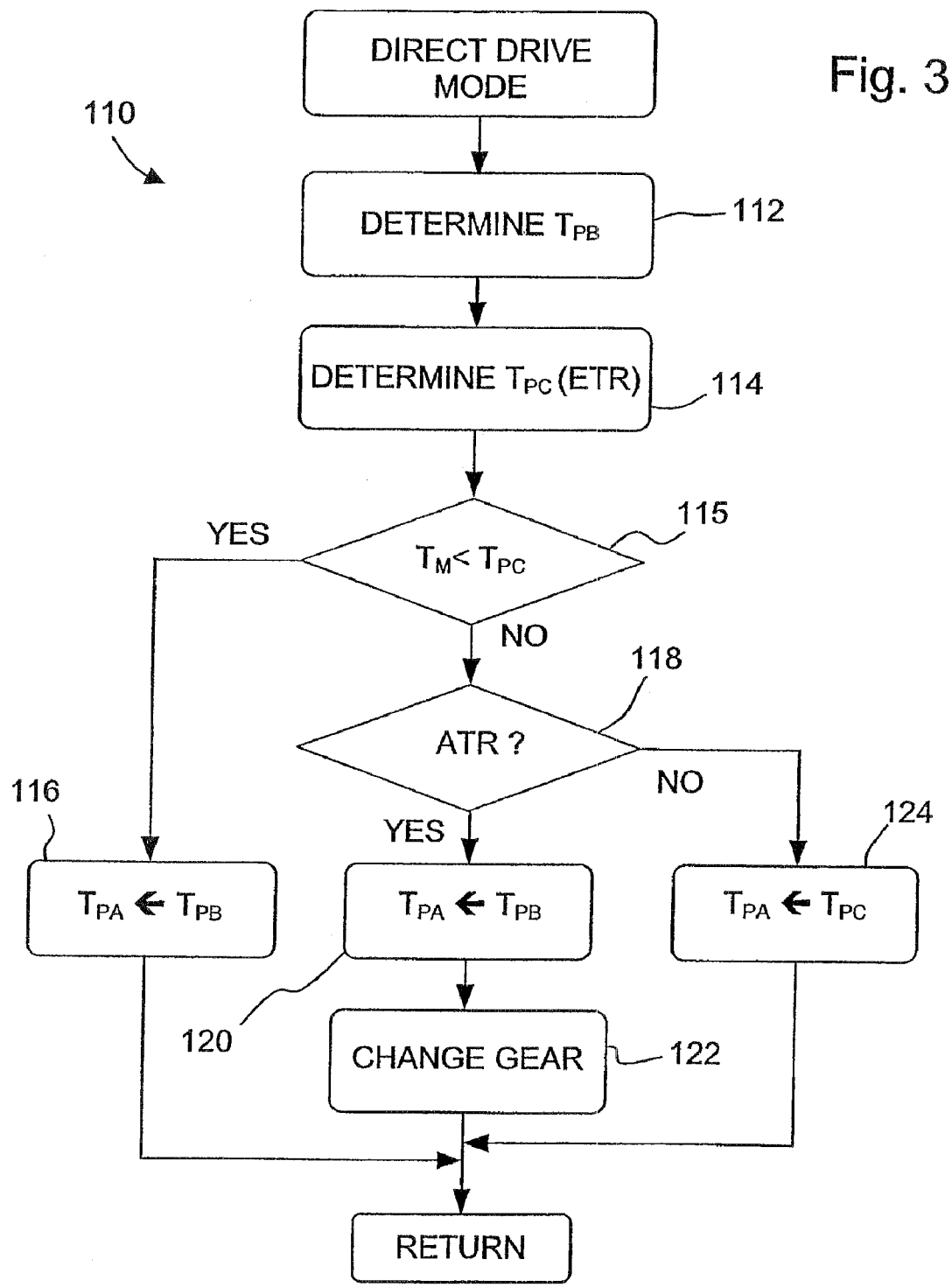
FIG. 3 is a flowchart illustrating a subroutine of the software routine of FIG. 2.

An exemplary embodiment of the drive mode subroutine 110 will be described with reference to FIG. 3. At step 112, a positive basic driver torque request $T_{PB}$ is determined in a well-known manner based on the position of the accelerator pedal and/or on the output of the cruise control subunit. The cruise control subunit should, however, be considered as purely optional. Preferably, step 112 calls a subroutine that is executed in the engine control unit and returns the positive basic driver torque request $T_{PB}$. The basic torque request $T_{PB}$ may be computed as a function of a variety of parameters relating to: the engine, itself (engine speed, engine temperature, exhaust gas temperature, pressure, throttle opening, etc.), to other components of the vehicle (engagement of the main clutch, ABS signals, engagement of an all-wheel drive mode, etc.); as well as environmental factors (anti-slip regulation (ASR), vehicle speed, detection of a slippery road surface). At step 114, the algorithm reads in the first matrix the positive torque capacity $T_{PC}$ corresponding to the engaged transmission ratio ETR. The measured torque value $T_M$ is then compared to the positive torque capacity $T_{PC}$ at step 115 to determine whether the capacity has been exceeded or not. If the torque capacity $T_{PC}$ has not been exceeded, the algorithm branches at step 116 and sets the actual positive torque value $T_{PA}$ equal to the basic positive torque value $T_{PB}$ before returning to the calling routine. If it has been actually exceeded, the algorithm branches at step 118 to determine whether there is an available transmission ratio ATR that would be compatible both with the transmission output shaft or propeller shaft revolution speed and with the measured torque value $T_M$. If such a transmission ratio can be identified, then the actual positive torque request $T_{PA}$ is set equal to the basic positive torque request $T_{PB}$ at step 120 and the algorithm proceeds to step 122. An order is then sent to the transmission control unit to engage the identified transmission ratio. Thereafter, the subroutine returns to the calling routine. If on the other hand no transmission ratio is compatible with the measured torque value $T_M$, the actual positive torque request $T_{PA}$ is set equal to the torque capacity $T_{PC}$ at step 124; and the algorithm returns to the calling routine. The execution of the algorithm 100 continues thereafter to deliver the actual torque request to the fuelling control subunit 34.

Figure 4:
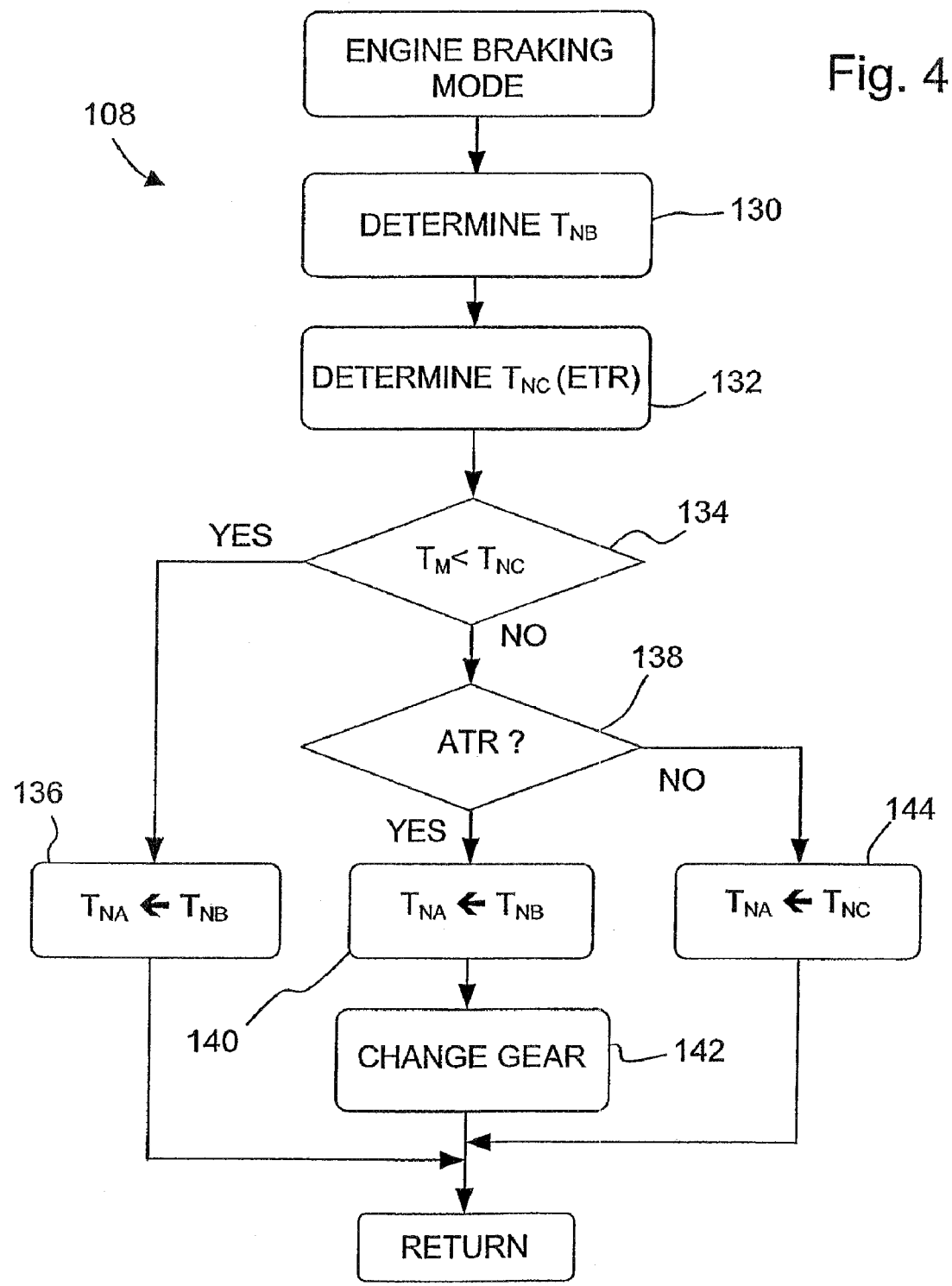
FIG. 4 is a flowchart illustrating another subroutine of the software routine of FIG. 2.

The engine braking mode 108 will now be discussed with reference to FIG. 4. The negative basic torque request $T_{NB}$ is first determined at step 130 based on, at least in part, the position of the selection switches. The algorithm proceeds at step 132 to read in the second matrix the driveline's negative torque capacity $T_{NC}$. A measured torque value $T_M$ is then compared at step 134 to the negative torque capacity $T_{NC}$ to determine whether the negative torque capacity has been exceeded or not. If the torque capacity $T_{NC}$ has not been exceeded, the algorithm branches at step 136 and sets the actual negative torque value TNA equal to the basic negative torque value $T_{NB}$ before returning to the calling routine. If the torque capacity $T_{NC}$ has been actually exceeded, the algorithm branches at step 138 to determine whether there is an available transmission ratio ATR that would be compatible both with the transmission output shaft or propeller shaft revolution speed and with the measured torque value $T_M$. If such a transmission ratio can be identified, then the actual negative torque request TNA is set equal to the basic negative torque request $T_{NB}$ at step 140 and the algorithm proceeds to step 142. An order is then sent to the transmission control unit to engage the identified transmission ratio. Thereafter, the subroutine returns to the calling routine. If on the other hand no transmission ratio is compatible with the measured torque value $T_M$, the actual negative torque request TNA is set equal to the torque capacity $T_{NC}$ at step 144, and the algorithm returns to the calling routine. The execution of algorithm 108 continues to transmit the actual negative torque request TNA to the engine braking control unit 36.

In addition to the engaged transmission ratio, other parameters can be used to determine the engine braking torque capacity. For instance, the torque capacity can be determined based both on the engaged transmission ratio and on a parameter representing a break-in condition of the transmission. The break-in condition can be assessed using a vehicle distance meter or a shaft revolution counter that is continuously incremented during the lifetime of the transmission. It may also prove useful to determine a break-in parameter for each individual transmission ratio. In such a case, the number of revolutions of the propeller shaft can be counted and stored individually in a matrix for each transmission ratio. Additionally or alternatively, it may also prove advantageous to take the warm-up of the transmission and of the driveline into account. Preferably, the oil temperature $\ominus$ in the transmission is measured to assess the warm-up of the transmission and used as a correction factor for determining the torque capacity. Alternatively, a revolution counter measuring the rotation of the propeller shaft can be used, provided this counter is reset to zero before each start of the vehicle.

Figure 5:
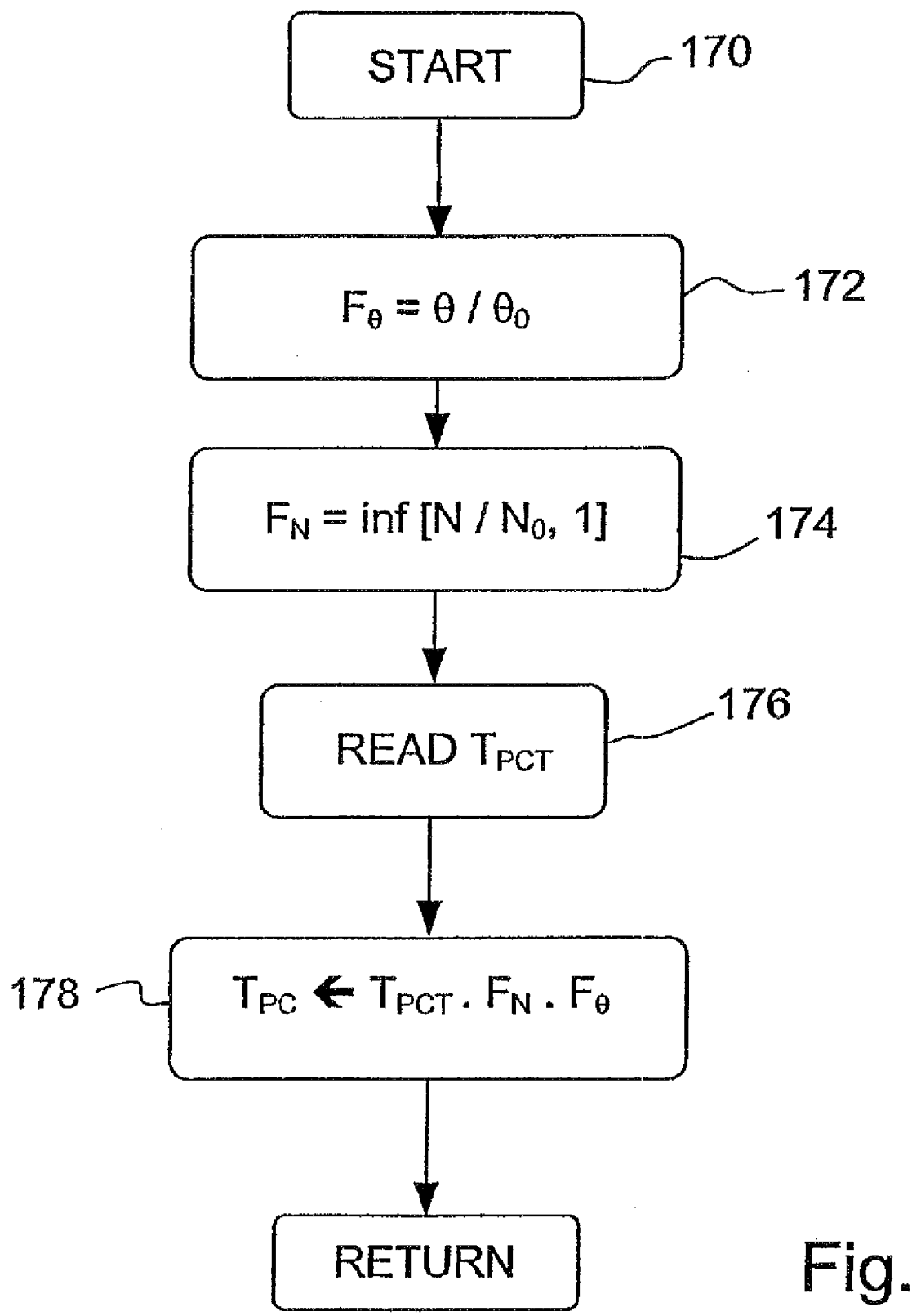
FIG. 5 is a flowchart illustrating a modification of a subroutine of the software routine of FIG. 2.

A subroutine taking both the warm-up and break-in conditions of the transmission into account is shown in FIG. 5. This subroutine is an alternative to step 114 of FIG. 3. The subroutine starts at step 170. At step 172, the subroutine computes a warm-up correction factor $F_\ominus$, which is a ratio of the measured temperature $\ominus$ to a rated temperature $\ominus_\ominus$. The subroutine then moves to step 174 to read the value N of a shaft revolution counter that is continuously incremented during the lifetime of the transmission and computes a break-in correction factor $F_B$, which is equal to the ratio of the shaft revolution counter value N to a fixed number of revolution $N_o$ indicating when an engine is considered to be broken in. Then, at 176, a theoretic positive torque capacity $T_{PCT}$ is read in a first matrix. The positive torque capacity $T_{PC}$ is then computed in step 178 based on the theoretic positive torque value $T_{PCT}$ multiplied by the warm-up correction factor $F_\ominus$ and by the break-in correction factor $F_B$. Of course, a similar routine can be used for the engine braking mode whereby step 132 of FIG. 4 is replaced. In that case, theoretical negative torque values $T_{NCT}$ are stored in the second matrix, and the negative torque capacity is equal to the theoretical negative torque value $T_{NCT}$ multiplied by the warm-up correction factor $F_\ominus$ and by the break-in correction factor $F_B$.

The parameters of the algorithm, namely the torque capacities $T_{NC}$, $T_{PC}$ or $T_{NCT}$, $T_{PCT}$ as well as the rated temperature $\Theta_0$ and the fixed number of revolutions $N_o$, can be predetermined by simulations. Preferably, these values can be programmed or re-programmed via the service or calibration tool 58. The data in matrices representing the torque capacities for the different gears can be replaced by a predetermined equation or function, which gives for each transmission ratio a torque capacity. In most cases, the data entered will be chosen in order to ensure an extended lifetime. In certain circumstances however, the customer may want to have the data customized in the factory to ensure more power, while allowing only a limited lifetime for the transmission components. Likewise, it is also possible to have the data customized so as to increase the durability of the transmission, while allowing only limited power and braking.

It should be emphasized that the method is iterative, so that the measured driveline torque $T_M$ of one iteration is the result of the actual torque request $T_{PA}$ or $T_{PA}$ applied as a result of the previous iteration. As a whole, the algorithm is such that the actual torque never exceeds the torque capacity.

While preferred embodiments of the invention have been described, it is to be understood by those skilled in the art that the invention is naturally not limited to these embodiments. Many variations are possible.

The torque limitation control unit can be omitted, and the memories 54, 56 for storing the torque capacities of the transmission ratios can be located elsewhere in the drivetrain control system, while the different steps of the method are executed by different units of the drivetrain control system. The torque limitation control unit can also be a subunit of one of the other units of the system; e.g., of the transmission control unit.

If the engine includes a turbocharger, the boost pressure of the turbocharger can be controlled to reduce powerplant induced torque.

While the torque capacities have been described with respect to the transmission, aspects of the invention also contemplate determining the torque capacities based on both the torque capacities of the transmission ratio and the torque capacities of the other components of the driveline. Of particular concern in this respect is the torque capacity of the propeller shaft, of the differential and of the driven axle in the engine braking mode. It may also prove advantageous to take into account torque limitations due to power take-offs that are engaged.

While both a drive mode and an engine braking mode have been described, it is also possible to implement the torque limitation only in one mode of operation of the drivetrain.

The invention can be applied both to front-wheel and rear-wheel drive vehicles, and also to all-wheel drive vehicles. The transmission can be a manual, a semi-automatic or an automatic transmission. It can also be a continuously variable transmission. The steps 118 to 122 and 138 to 142 are optional.

For the sake of simplification, it has been considered that all needed signals are read at step 104 of the algorithm. It is, however, also possible to read each of the signals precisely when it is needed.

More generally, the method of controlling the torque has been described by reference to software. It is however clear that the same method can be implemented by an analog integrated circuit.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

What is claimed is:

1. A method for controlling actual torque in a driveline of a land-based motor vehicle, the motor vehicle including a drivetrain having a powerplant interconnected with at least one ground engaging drive wheel via a driveline, the driveline including at least a variable ratio transmission, the method comprising the steps of:

taking a direct, non-predictive measure of actual torque induced in the driveline of the motor vehicle and ascertaining a magnitude thereof;

ascertaining a magnitude of a torque demand being requested to be instituted in the driveline;

comparing the ascertained magnitude of the direct, non-predictive measure of actual torque taken with a driveline-configuration dependent maximum torque threshold and thereby ascertaining an over-threshold torque condition in the driveline based thereupon; and applying at least one over-threshold torque compensating effect chosen from the group comprising (a) reconfiguring the variable ratio transmission and (b) reducing powerplant-induced driveline torque.

2. The method as recited in claim 1, further comprising determining, prior to choosing reconfiguration of the variable ratio transmission, that, based on existing vehicle operating conditions and the magnitude of the torque demand being requested to be instituted in the driveline, a plurality of acceptable configurations of the variable ratio transmission exist that diminish the ascertained over-threshold torque condition in the driveline; and selecting among the plurality of acceptable configurations of the variable ratio transmission one that provides a best-fit with prescribed operational criteria.

3. The method as recited in claim 1, further comprising determining, prior to choosing reconfiguration of the variable ratio transmission, that, based on existing vehicle operating conditions and the magnitude of the torque demand being requested to be instituted in the driveline, at least one acceptable configuration of the variable ratio transmission exists that diminishes the ascertained over-threshold torque condition in the driveline.

4. The method as recited in claim 3, further comprising reconfiguring the variable ratio transmission to the at least one acceptable configuration of the variable ratio transmission determined to diminish the ascertained over-threshold torque condition in the driveline.

5. The method as recited in claim 1, further comprising utilizing a torque sensor positioned at the driveline to measure the actual torque induced in the driveline of the motor vehicle.

6. The method as recited in claim 5, further comprising tuning the powerplant, on an after-market basis, thereby achieving greater powerplant output capacity without risk of detrimental affect on the driveline of the motor vehicle.

7. The method as recited in claim 5, further comprising facilitating the pairing of an over-capacity powerplant with a relative under capacity driveline.

8. The method as recited in claim 5, further comprising facilitating the pairing of a powerplant having a capacity for producing torque of magnitude greater than a paired driveline is capable of accommodating.

9. The method as recited in claim 5, further comprising preventing erroneous detection of over-threshold torque conditions in the driveline thereby avoiding detrimental reductions of powerplant output when not required.

10. The method as recited in claim 1, further comprising reducing the driveline-configuration dependent maximum torque threshold based on an ascertainment that the driveline is not fully broken in.

11. The method as recited in claim 1, further comprising reducing the driveline-configuration dependent maximum torque threshold based on an ascertainment that a temperature of the driveline is below a prescribed operating temperature.

12. The method as recited in claim 1, further comprising adjusting the driveline-configuration dependent maximum torque threshold based on a locked status of a differential interconnected with the driveline.

13. The method as recited in claim 1, further comprising increasing the driveline-configuration dependent maximum torque threshold thereby enabling greater engine braking capacity and reducing the service life period of the driveline.

14. The method as recited in claim 1, further comprising decreasing the driveline-configuration dependent maximum torque threshold thereby reducing engine braking capacity and increasing the service life period of the driveline.

15. The method as recited in claim 1, wherein the step of choosing an over-threshold torque compensating effect comprises choosing reconfiguring the ratio of the variable ratio transmission.

16. The method as recited in claim 1, further comprising ascertaining a plurality of threshold torque capacities of the driveline, each dependent upon discreet and different configurations of the variable ratio transmission; determining which ratio configuration would produce a least-excessive torque magnitude based on a comparison between the determined torque demand and the plurality of threshold torque capacities; and reconfiguring the variable ratio transmission to the determined ratio configuration thereby producing a minimized over-threshold torque sufficient to satisfy the torque demand magnitude and mechanically preserving the driveline.

17. The method as recited in claim 1, further comprising executing the taking a direct, non-predictive measure of actual torque induced in the driveline of the motor vehicle and ascertaining a magnitude thereof when a travel-retarding torque is being imposed on the driveline by the powerplant that is in an engine-braking mode.

18. The method as recited in claim 17, further comprising ascertaining an engine brake demand magnitude and a speed of the motor vehicle; determining whether the variable ratio transmission includes a ratio configuration compatible with the ascertained speed of the motor vehicle which will produce a non-excessive torque magnitude in the driveline; and reconfiguring the variable ratio transmission to the compatible ratio configuration that produces the non-excessive torque magnitude thereby mechanically preserving the driveline.

19. The method as recited in claim 17, further comprising ascertaining an engine brake demand magnitude and a speed of the motor vehicle; determining whether the variable ratio transmission includes a ratio configuration compatible with the ascertained speed of the motor vehicle which will produce a least-excessive torque magnitude in the driveline; and reconfiguring the variable ratio transmission to the compatible ratio configuration that produces the least-excessive torque magnitude thereby mechanically preserving the driveline.

20. The method as recited in claim 17, further comprising ascertaining an engine brake demand magnitude; determining, of all possible ratio configurations of the variable ratio transmission, which ratio configuration would produce a least-excessive torque magnitude in the driveline of the motor vehicle; and reconfiguring the variable ratio transmission to the determined ratio configuration thereby producing sufficient engine braking torque and mechanically preserving the driveline.

21. The method as recited in claim 17, further comprising ascertaining an engine brake demand magnitude and determining a corresponding torque demand required to be induced in the driveline to produce the engine brake demand magnitude; ascertaining a plurality of threshold torque capacities of the driveline, each dependent upon discreet and different configurations of the variable ratio transmission; determining which ratio configuration would produce a least-excessive torque magnitude based on a comparison between the determined torque demand and the plurality of threshold torque capacities; and reconfiguring the variable ratio transmission to the determined ratio configuration thereby producing a minimized over-threshold engine braking torque sufficient to satisfy the engine brake demand magnitude and mechanically preserving the driveline.

22. The method as recited in claim 17, further comprising ascertaining an engine brake demand magnitude and determining a corresponding torque demand required to be induced in the driveline to produce the engine brake demand magnitude; ascertaining a plurality of threshold torque capacities of the driveline, each dependent upon discreet and different configurations of the variable ratio transmission; determining which ratio configuration would produce a least-deficient torque magnitude based on a comparison between the determined torque demand and the plurality of threshold torque capacities; and reconfiguring. the variable ratio transmission to the determined ratio configuration thereby producing a minimized under-threshold engine braking torque and mechanically preserving the driveline.

23. The method as recited in claim 17, further comprising ascertaining an engine brake demand magnitude and determining a corresponding torque demand required to be induced in the driveline to produce the engine brake demand magnitude; ascertaining a plurality of threshold torque capacities of the driveline, each dependent upon discreet and different configurations of the variable ratio transmission; determining which ratio configuration would produce a least-different torque magnitude based on a comparison between the determined torque demand and the plurality of threshold torque capacities; and reconfiguring the variable ratio transmission to the determined ratio configuration thereby producing sufficient engine braking torque and mechanically preserving the driveline.

24. The method as recited in claim 23, further comprising considering, in the ascertainment of the plurality of threshold torque capacities of the driveline, an operational condition of the driveline that is variable.

25. The method as recited in claim 24, further comprising selecting the variable operational condition of the driveline to be a measured current period of operation of the driveline.

26. The method as recited in claim 24, further comprising selecting the variable operational condition of the driveline to be a measured operating temperature of the driveline.

27. The method as recited in claim 24, further comprising selecting the variable operational condition of the driveline to be a measured in-service life of the driveline.

28. The method as recited in claim 27, further comprising basing the in-service life measurement of the driveline on a signal of a sensor selected from a group consisting of an odometer, a shaft revolution counter, a vehicle speed sensor, a driven wheel speed sensor, a drive wheel speed sensor.

29. A land vehicle drivetrain control device comprising a processor and readable medium configured and programmed to execute the method recited in claim 1.

30. A land vehicle having a drivetrain and control device therefore, the control device comprising a processor and readable medium configured and programmed to execute the method recited in claim 1.

31. A computer readable medium comprising program code adapted to, upon execution on a computer, perform the method recited in claim 1.

32. A computer program product comprising program code on a computer readable medium for performing the method recited in claim 1 when executed on a computer.

33. A computer program product directly loadable into the internal memory of a digital computer, comprising software code portions for performing the method recited claim 1 when executed on a computer.

* * * * *